US012744352B2

(12) United States Patent
Streckewald et al.

(10) Patent No.: US 12,744,352 B2
(45) Date of Patent: Sep. 22, 2026

(54) ELECTRICAL CONNECTOR SYSTEM

(71) Applicants: TE Connectivity Solutions GmbH, Schaffhausen (CH); Tyco Electronics Holdings (Bermuda) No. 7 Limited, Bermuda (BM); Tyco Electronics (Shanghai) Co., Ltd., Shanghai (CN)

(72) Inventors: Michael Streckewald, Harrisburg, PA (US); Huei-Shun Feng, Taipei (TW); Qiaoli Chen, Shanghai (CN)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 359 days.

(21) Appl. No.: 18/403,865

(22) Filed: Jan. 4, 2024

(65) Prior Publication Data

US 2025/0183597 A1 Jun. 5, 2025

(51) Int. Cl.

*H01R 13/6587* (2011.01)
*H01R 12/71* (2011.01)
*H01R 13/05* (2006.01)
*H01R 13/502* (2006.01)
*H01R 13/6585* (2011.01)

(52) U.S. Cl.

CPC ....... *H01R 13/6587* (2013.01); *H01R 12/716* (2013.01); *H01R 13/05* (2013.01); *H01R 13/502* (2013.01); *H01R 13/6585* (2013.01)

(58) Field of Classification Search

CPC .. H01R 13/6587; H01R 12/716; H01R 13/05; H01R 13/502; H01R 13/6585; H01R 12/75; H01R 13/6582; H01R 13/6471; H01R 13/02; H01R 13/648; H01R 13/652; H01R 24/005

See application file for complete search history.

(56) References Cited

U.S. PATENT DOCUMENTS 6,347,962 B1 * 2/2002 Kline ................ H01R 13/6471 439/607.09
9,166,343 B1 * 10/2015 Jeon ....................... H01R 12/73
10,297,966 B1 * 5/2019 Hamner ............... H01R 13/518
2015/0236450 A1 * 8/2015 Davis ................. H01R 13/6585 439/78
2016/0013594 A1 * 1/2016 Costello ............. H01R 13/6587 439/607.12
2016/0118751 A1 * 4/2016 McClellan ......... H01R 13/6587 439/607.08
2021/0399493 A1 * 12/2021 Song ................ H01R 13/65912
2023/0137227 A1 * 5/2023 Guo ..................... H01R 13/533 439/78

* cited by examiner

*Primary Examiner* — Travis S Chambers

(57) ABSTRACT

An electrical connector system includes a receptacle connector having a receptacle housing with walls forming a receptacle that holds a receptacle contact assembly. The receptacle contact assembly includes signal and ground contacts. The receptacle signal contacts are arranged in pairs in receptacle signal rows. The receptacle ground contacts are arranged in receptacle ground rows offset from the receptacle signal rows. A plug connector is plugged into the receptacle and includes a plug housing holding a plug contact assembly. The plug housing has shield walls parallel to each other and shield spaces between the shield walls. The plug contact assembly includes plug signal contacts arranged in pairs located in the shield spaces in plug signal rows. The receptacle signal contacts are mated with the corresponding plug signal contacts. The receptacle ground contacts are mated with the corresponding shield walls.

21 Claims, 5 Drawing Sheets

ELECTRICAL CONNECTOR SYSTEM

CROSS REFERENCE TO RELATED APPLICATIONS

This application claims the benefit of CN application No. 202311660544.6 filed 5 Dec. 2023, the subject matter of which is herein incorporated by reference in its entirety.

BACKGROUND OF THE INVENTION

The subject matter herein relates generally to electrical connectors.

Electrical connectors are used to connect various components within a system. Electrical connectors may be used to connect circuit boards and/or electronic packages. There is an ongoing trend toward smaller, lighter, and higher performance electrical components and higher density electrical circuits. Increased density of contacts in electrical connectors have a tendency to increase crosstalk and induce resonances in the circuits. Some known connectors use shield structures or ground contacts surrounding signal contacts to reduce crosstalk. However, the increased use of ground contacts in the connector limits the density of the electrical connector or increase the footprint and size of the electrical connector. systems are struggling with meeting signal output while maintaining good electrical performance through the system.

A need remains for a communication system having improved electrical performance.

BRIEF DESCRIPTION OF THE INVENTION

In one embodiment, an electrical connector system is provided and includes a receptacle connector that includes a receptacle housing holding a receptacle contact assembly. The receptacle housing has walls forming a receptacle. The receptacle contact assembly includes receptacle signal contacts and receptacle ground contacts. The receptacle signal contacts are arranged in pairs. The receptacle signal contacts are arranged in receptacle signal rows. The receptacle ground contacts are arranged in receptacle ground rows offset from the receptacle signal rows. The electrical connector system includes a plug connector configured to be plugged into the receptacle. The plug connector includes a plug housing holding a plug contact assembly. The plug housing has shield walls arranged parallel to each other and shield spaces between the shield walls. The plug contact assembly includes plug signal contacts arranged in pairs. The plug signal contacts located in the shield spaces in plug signal rows. The receptacle signal contacts are mated with the corresponding plug signal contacts. The receptacle ground contacts are mated with the corresponding shield walls.

In another embodiment, a receptacle connector configured to be mated with a plug connector of an electrical connector system is provided. The receptacle connector includes a receptacle housing that has walls forming a receptacle. The walls include a front wall and a rear wall. The receptacle connector includes a receptacle contact assembly held in the receptacle housing. The receptacle contact assembly includes receptacle signal contacts and receptacle ground contacts. The receptacle signal contacts are arranged in pairs. The receptacle signal contacts are arranged in receptacle signal rows without any receptacle ground contacts are arranged between the pairs of the receptacle signal contacts. The receptacle ground contacts are arranged in receptacle ground rows offset from the receptacle signal rows.

In a further embodiment, a plug connector configured to be mated with a receptacle connector of an electrical connector system is provided. The plug connector includes a plug housing that has shield walls arranged parallel to each other and shield spaces between the shield walls. The receptacle connector includes a plug contact assembly held in the plug housing. The plug contact assembly includes plug signal contacts arranged in pairs. The plug signal contacts are located in the shield spaces in plug signal rows. Air gaps are defined between the pairs of the plug signal contacts in the plug signal rows. The receptacle connector includes cables coupled to the plug contact assembly. The cables include conductors and cable shields surrounding the conductors. The conductors terminated to the corresponding plug signal contacts. The cable shields are electrically connected to the plug housing. The cables extend from the housing.

DETAILED DESCRIPTION OF THE INVENTION

Figure 1:
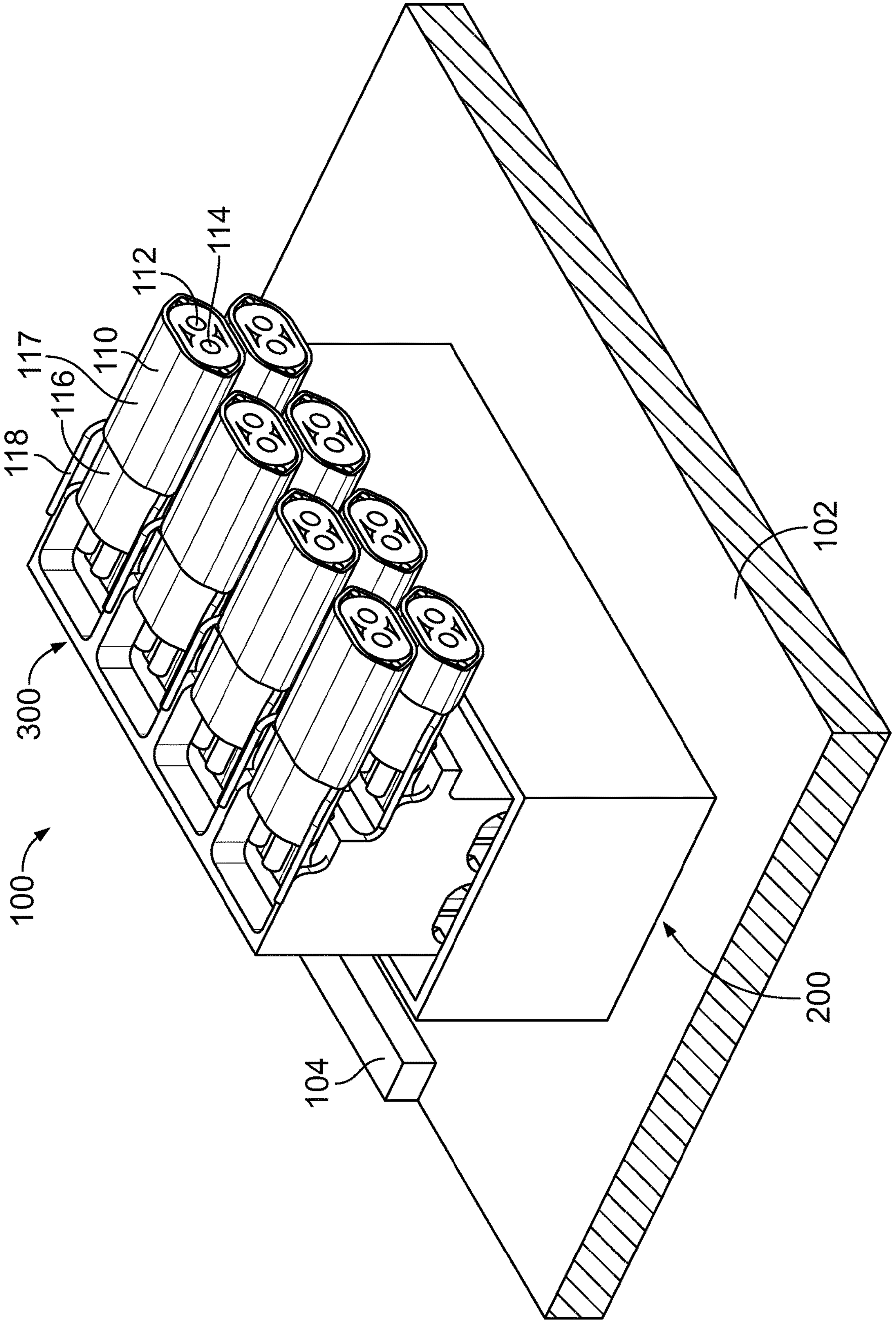
FIG. 1 illustrates an electrical connector system in accordance with an exemplary embodiment.

FIG. 1 illustrates an electrical connector system 100 in accordance with an exemplary embodiment. The electrical connector system 100 includes a receptacle connector 200 and the plug connector 300 configured to be plugged into the receptacle connector 200.

In the illustrated embodiment, the receptacle connector 200 is a board mounted connector mounted to a circuit board 102. However, in alternative embodiments, the receptacle connector 200 may be a cable connector mounted to one or more cables (not shown). The receptacle connector 200 may be electrically connected to an electrical component 104 mounted to the circuit board 102. The electrical component 104 may be an integrated circuit, such as an IC chip. The electrical component 104 may be another type of component in alternative embodiments, such as a processor, a memory module, another electrical connector, and the like. The receptacle connector 200 is connected to the electrical component 104 through one or more circuits of the circuit board 102. Optionally, the receptacle connector 200 may be mounted in close proximity to the electrical component 104, such as immediately adjacent the electrical component 104 to reduce or minimize the lengths of the circuits between the receptacle connector 200 and the electrical component 104 for improved signal integrity. Optionally, multiple receptacle connectors 200 may be mounted to the circuit board 102. The multiple receptacle connectors 200 may be electrically connected to the same electrical component 104 or to different electrical components mounted to the circuit board 102.

In the illustrated embodiment, the plug connector 300 is a cable connector having one or more cables 110 extending from the plug connector 300. In various embodiments, the plug connector 300 may be a right angle connector having the cables 110 exiting the plug connector 300 in a direction perpendicular to the mating direction with the receptacle connector 200. Optionally, all of the cables 110 may exit the plug connector 300 at the same side. In alternative embodiments, the cables 110 may exit the plug connector 300 from different sides, such as both the front and the rear of the plug connector 300. In other various embodiments, the cables 110 may exit the plug connector 200 from other areas, such as the top of the plug connector 300. In various embodiments, the cables 110 may be arranged in multiple rows, such as having the cables 110 stacked on top of each other when exiting the plug connector 300. In various embodiments, the cables 110 over twin-axial cables each having a pair of conductors 112, 114 and a cable shield 116 surrounding the conductors 112, 114. A cable jacket 117 may surround the cable shield 116. Optionally, one or more drain wires 118 may be arranged in the core of the cable 110, which is electrically connected to the cable shield 116. The drain wires 118 and/or the cable shield 116 may be electrically grounded or commoned to a ground plane of the plug connector 300. In alternative embodiments, the plug connector 300 may be a board mounted connector configured to be mounted to a circuit board (not shown). For example, the receptacle connector 200 and the plug connector 300 may be a mezzanine connectors mounted between a pair of circuit boards. The circuit boards may be oriented parallel to each other. In alternative embodiments, the circuit boards may be oriented perpendicular to each other.

In an exemplary embodiment, the electrical connector system 100 has a low-profile. For example, the receptacle connector 200 and the plug connector 300 may have a low clearance or height above the circuit board 102, which may allow placement of other components above the circuit board 102. For example, a heatsink (not shown) may be mounted to the circuit board 102 and/or the electrical component 104 and extend immediately above the receptacle connector 200 and the plug connector 300. The cables 110 exit from the side of the plug connector 300 to lower the profile of the electrical connector system 100, such as to allow placement of the heat sink or other component above the electrical connector system 100.

Figure 2:
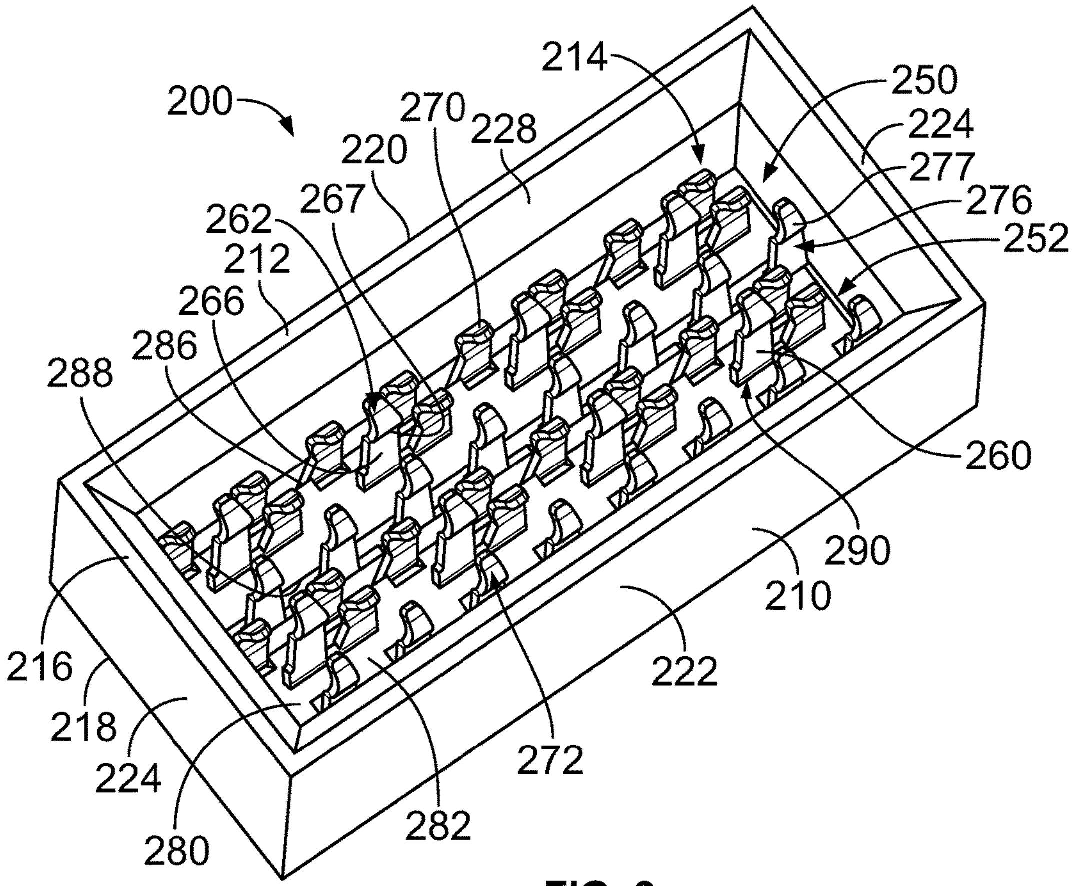
FIG. 2 is a top perspective view of the receptacle connector in accordance with an exemplary embodiment.
Figure 3:
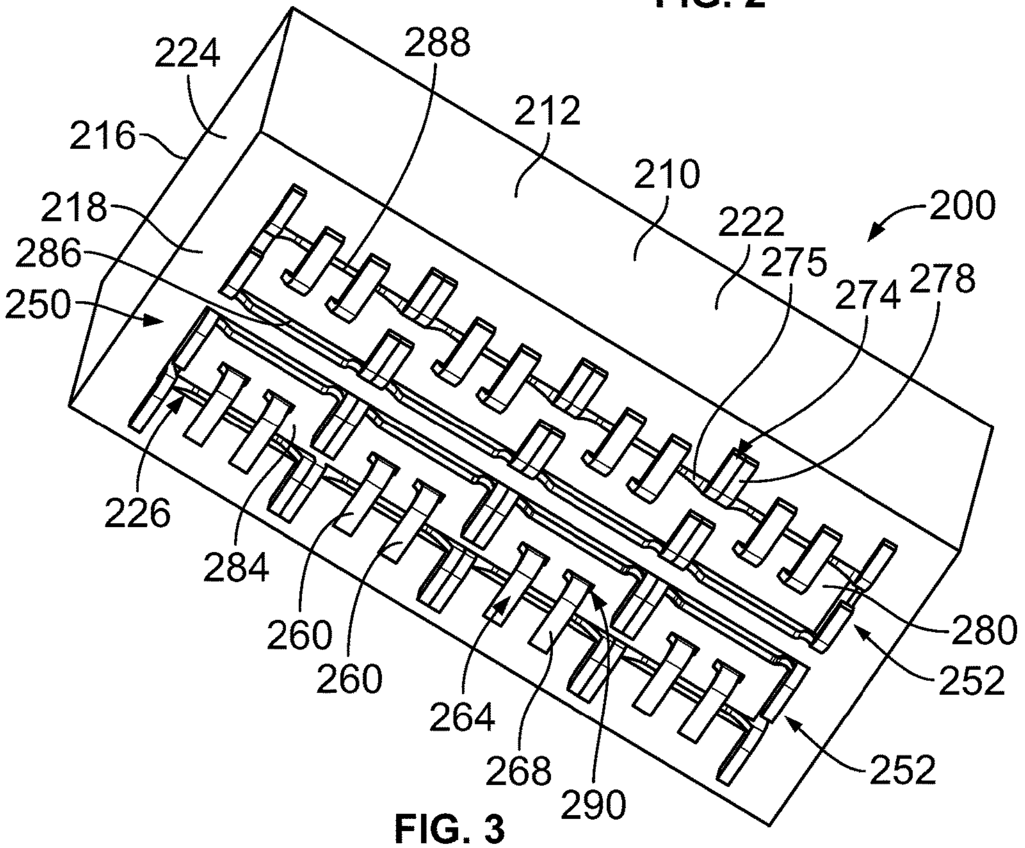
FIG. 3 is a bottom perspective view of the receptacle connector in accordance with an exemplary embodiment.

FIG. 2 is a top perspective view of the receptacle connector 200 in accordance with an exemplary embodiment. FIG. 3 is a bottom perspective view of the receptacle connector 200 in accordance with an exemplary embodiment.

The receptacle connector 200 includes a receptacle housing 210 holding a receptacle contact assembly 250. The receptacle housing 210 includes walls 212 forming a receptacle 214. In the illustrated embodiment, the receptacle 214 is generally rectangular shaped. However, the receptacle 214 may have other shapes in alternative embodiments. The walls 212 extend between a top 216 and the bottom 218 of the receptacle housing 210. The receptacle 214 is open at the top 216 to receive the plug connector 300 (FIG. 1). The bottom 218 is configured to be mounted to the circuit board 102 (FIG. 1). In an exemplary embodiment, the walls 212 include a front wall 220 and a rear wall 222 opposite the front wall 220. Optionally, the walls 212 may include end walls 224 between the front and rear walls 220, 222. However, in alternative embodiments, the receptacle housing 210 may be open at the ends between the front and rear walls 220, 222. The receptacle housing 210 extends longitudinally between the ends. For example, the front and rear walls 220, 222 may be oriented parallel to the longitudinal axis of the receptacle housing 210. For example, the receptacle housing 210 is longer end to end and shorter front to rear.

In an exemplary embodiment, the receptacle housing 210 is manufactured from a dielectric material, such as a plastic material. However, in alternative embodiments, the receptacle housing 210 may be manufactured from a conductive material, such as a metal material or a conductive plastic material, to provide shielding for the receptacle contact assembly 250.

In an exemplary embodiment, the receptacle housing 210 includes one or more openings 226 at the bottom 218 that receive the receptacle contact assembly 250. For example, the receptacle housing 210 may include a pair of the openings 226 separated by a wall that receive corresponding portions of the receptacle contact assembly 250. The receptacle housing 210 may include greater or fewer openings 226 in alternative embodiments.

In an exemplary embodiment, the walls 212 include guide surfaces 228, such as angled sections of the walls 212, to guide the plug connector 300 into the receptacle 214. The walls 212 may include one or more polarization or keying features (not shown) to orient the plug connector 300 in the receptacle 214. The walls 212 may include mounting features (not shown) for mounting the receptacle housing 210 to the circuit board 102. The mounting features may be flanges or other types of mounting tabs configured to receive fasteners to secure the receptacle housing 210 to the circuit board 102. The receptacle connector 200 may be secured to the circuit board 102 by other means in alternative embodiments.

The receptacle contact assembly 250 is coupled to the receptacle housing 210. The receptacle contact assembly 250 is configured to be terminated to the circuit board 102, such as to corresponding circuits of the circuit board 102. The receptacle contact assembly 250 is configured to be mated with the plug connector 300. In an exemplary embodiment, the receptacle contact assembly 250 includes a plurality of contacts, which include signal contacts and ground contacts, configured to be electrically connected to the plug connector 300. Optionally, the receptacle contact assembly 250 may additionally or alternatively include power contacts.

In an exemplary embodiment, the receptacle contact assembly 250 includes a plurality of receptacle signal contacts 260 and a plurality of receptacle ground contacts 270. The receptacle signal contacts 260 form signal transmission lines through the receptacle connector 200 to electrically connect the plug connector 300 to the circuit board 102. The receptacle ground contacts 270 provide shielding for the receptacle signal contacts 260. In an exemplary embodiment, the receptacle signal contacts 260 are arranged in pairs, which may be configured to convey differential signals. The receptacle ground contacts 270 are arranged in rows to provide shielding between the corresponding pairs of the receptacle signal contacts 260. In an exemplary embodiment, the receptacle ground contacts 270 are offset from the receptacle signal contacts 260 such that no receptacle ground contacts 270 are located in line with the rows of the receptacle signal contacts 260. Rather, the rows of the receptacle ground contacts 270 are staggered or offset relative to the receptacle signal contacts 260.

Each receptacle signal contact 260 includes a mating end 262 and a terminating end 264. The mating end 262 is configured to be mated with the plug connector 300. The terminating end 264 is configured to be terminated to the circuit board 102. In an exemplary embodiment, the receptacle signal contacts 260 are stamped and formed contacts. Optionally, a plurality of the receptacle signal contacts 260 may be formed from a lead frame where the receptacle signal contacts 260 are stamped from a common metal sheet and may be connected together by a carrier strip (not shown) which is removed during assembly, such as after the receptacle signal contacts 260 are overmolded or otherwise retained within a contact holder.

In the illustrated embodiment, the mating end 262 includes a spring beam 266 configured to be mated with a corresponding plug signal contact of the plug connector 300. The spring beam 266 is deflectable. The spring beam 266 is cantilevered into the receptacle 214 for mating with the plug connector 300. The spring beam 266 includes a mating interface 267 at or near the distal end of the spring beam 266. The spring beam 266 may be curved at the distal end to define the mating interface 267. Other types of contacts may be used in alternative embodiments, such as pin contacts, socket contacts, blade contacts, and the like.

In the illustrated embodiment, the terminating end 264 includes a solder tail 268 configured to be soldered to a board contact or pad of the circuit board 102. Optionally, the solder tail 268 may be bent at a right angle relative to the spring beam 266. For example, the solder tail 268 may be oriented generally horizontally while the spring beam 266 may be oriented generally vertically. Other types of terminating portions may be provided at the terminating end 264, such as compliant pins or eye of the needle pins configured to be press-fit into vias of the circuit board 102. In other alternative embodiments, solder balls may be provided at the terminating ends 264. In other various embodiments, weld pads or solder pads may be provided at the terminating end 264 for connection to conductors of a cable.

Each receptacle ground contact 270 includes a mating end 272 and a terminating end 274. The mating end 272 is configured to be mated with the plug connector 300. The terminating end 274 is configured to be terminated to the circuit board 102. In an exemplary embodiment, the receptacle ground contacts 270 may be connected together by connecting beams 275. For example, the receptacle ground contacts 270 and the connecting beams 275 may be stamped and formed from a metal sheet to electrically common some or all of the receptacle ground contacts 270.

In the illustrated embodiment, the mating end 272 includes a spring beam 276 configured to be mated with a corresponding plug ground contact of the plug connector 300. The spring beam 276 is deflectable. The spring beam 276 is cantilevered into the receptacle 214 for mating with the plug connector 300. The spring beam 276 includes a mating interface 277 at or near the distal end of the spring beam 276. The spring beam 276 may be curved at the distal end to define the mating interface 277. Other types of contacts may be used in alternative embodiments, such as pin contacts, socket contacts, blade contacts, and the like.

In the illustrated embodiment, the terminating end 274 includes a solder tail 278 configured to be soldered to a board contact or pad of the circuit board 102. Optionally, the solder tail 278 may be bent at a right angle relative to the spring beam 276. For example, the solder tail 278 may be oriented generally horizontally while the spring beam 276 may be oriented generally vertically. Other types of terminating portions may be provided at the terminating end 274, such as compliant pins or eye of the needle pins configured to be press-fit into vias of the circuit board 102. In other alternative embodiments, solder balls may be provided at the terminating ends 274. In other various embodiments, weld pads or solder pads may be provided at the terminating end 274 for connection to conductors of a cable.

In an exemplary embodiment, the receptacle contact assembly 250 includes one or more contact holders 280 that hold the receptacle signal contacts 260 and/or the receptacle ground contacts 270. In the illustrated embodiment, the receptacle connector 200 includes a pair of the contact holders 280. However, the receptacle connector 200 may include greater or fewer contact holders 280 in alternative embodiments. The contact holder 280 is configured to be coupled to the receptacle housing 210 to position the receptacle signal contacts 260 and receptacle ground contacts 270 relative to the receptacle housing 210. In some embodiments, each contact holder 280 may hold a pair of the receptacle signal contacts 260 to position the pair of the receptacle signal contacts 260 in the receptacle housing 210. In other alternative embodiments, the receptacle connector 200 may be provided without any contact holders 280. Rather, the receptacle signal contacts 260 and the receptacle ground contacts 270 may be held directly in the receptacle housing 210, such as in corresponding openings or channels in the bottom wall of the receptacle housing 210.

In an exemplary embodiment, the contact holder 280 is manufactured from a dielectric material. For example, the contact holder 280 may be a molded plastic part. In various embodiments, the contact holder 280 may be formed in place on the receptacle signal contacts 260 and/or the receptacle ground contacts 270. For example, the contact holder 280 may include an overmold body that is overmolded over the receptacle signal contacts 260 and/or the receptacle ground contacts 270. In alternative embodiments, the receptacle signal contacts 260 and/or the receptacle ground contacts 270 may be stitched or otherwise loaded into the pre-molded contact holder 280.

The contact holder 280 includes a top 282 and a bottom 284. The contact holder 280 includes a front 286 and a rear 288 opposite the front 286. The contact holder 280 includes channels 290 that receive the corresponding receptacle signal contacts 260 and/or the receptacle ground contacts 270. The channels 290 extend between the top 282 and the bottom 284. In the illustrated embodiment, the channels 290 receive the corresponding receptacle signal contacts 260, whereas the receptacle ground contacts 270 are arranged at the front 286 and/or the rear 288. However, in alternative embodiments, the contact holder 280 may include channels 290 that hold the receptacle ground contacts 270.

In an exemplary embodiment, the receptacle signal contacts 260 are assembled with the contact holder 280 prior to loading the contact holder 280 into the receptacle housing 210. For example, the contact holder 280 is used to load the receptacle signal contacts 260 into the receptacle housing 210. In an exemplary embodiment, the contact holder 280 is received in the corresponding opening 226 in the receptacle housing 210. In an exemplary embodiment, the receptacle ground contacts 270 are assembled with the contact holder 280 prior to loading the contact holder 280 into the receptacle housing 210. For example, the contact holder 280 is used to load the receptacle ground contacts 270 into the receptacle housing 210. In the illustrated embodiment, each contact holder 280 holds a row of the receptacle signal contacts 260 approximately centered between the front 286 and the rear 288. An array of the receptacle ground contacts 270 are arranged along both the front 286 and the rear 288 of the contact holder 280. As such, the receptacle signal contacts 260 are flanked both forward of and rearward of the row of the receptacle signal contacts 260 by the corresponding receptacle ground contacts 270. The contact subassembly 252 (the contact holder 280 holding the receptacle signal contacts 260 and the arrays of receptacle ground contacts 270) is configured to be loaded into the receptacle housing 210 as a unit. In the illustrated embodiment, the receptacle contact assembly 250 includes a pair of the contact subassemblies 252. However, the receptacle contact assembly 250 may include a single contact subassembly 252 or more than two of the contact subassemblies 252 in alternative embodiments.

Figure 4:
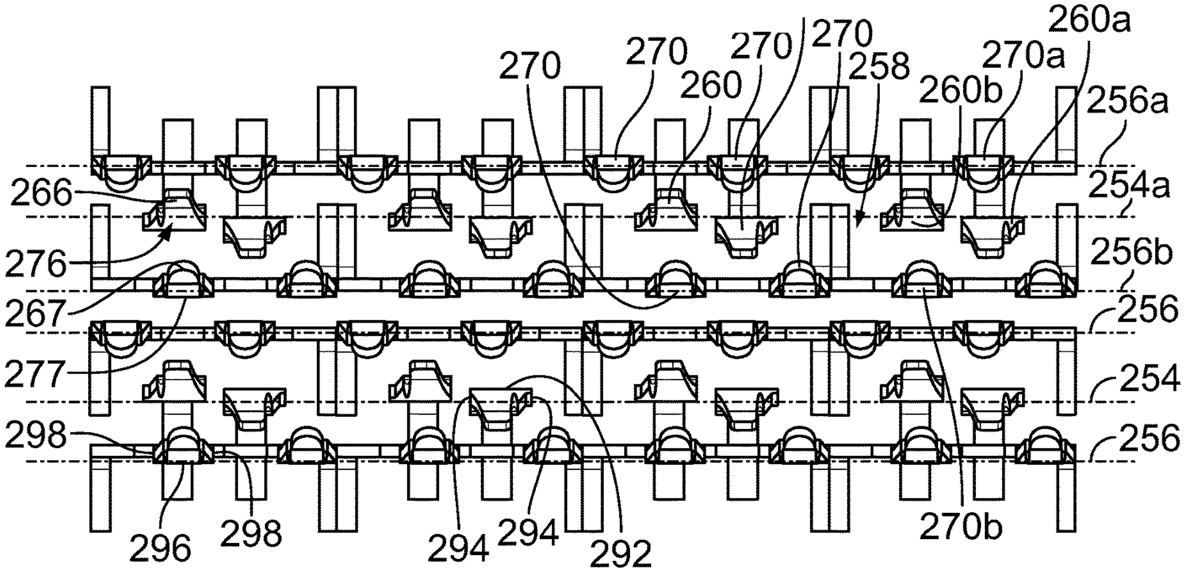
FIG. 4 is a top view of a portion of the receptacle connector showing the receptacle signal contacts and the receptacle ground contacts in accordance with an exemplary embodiment.
Figure 5:
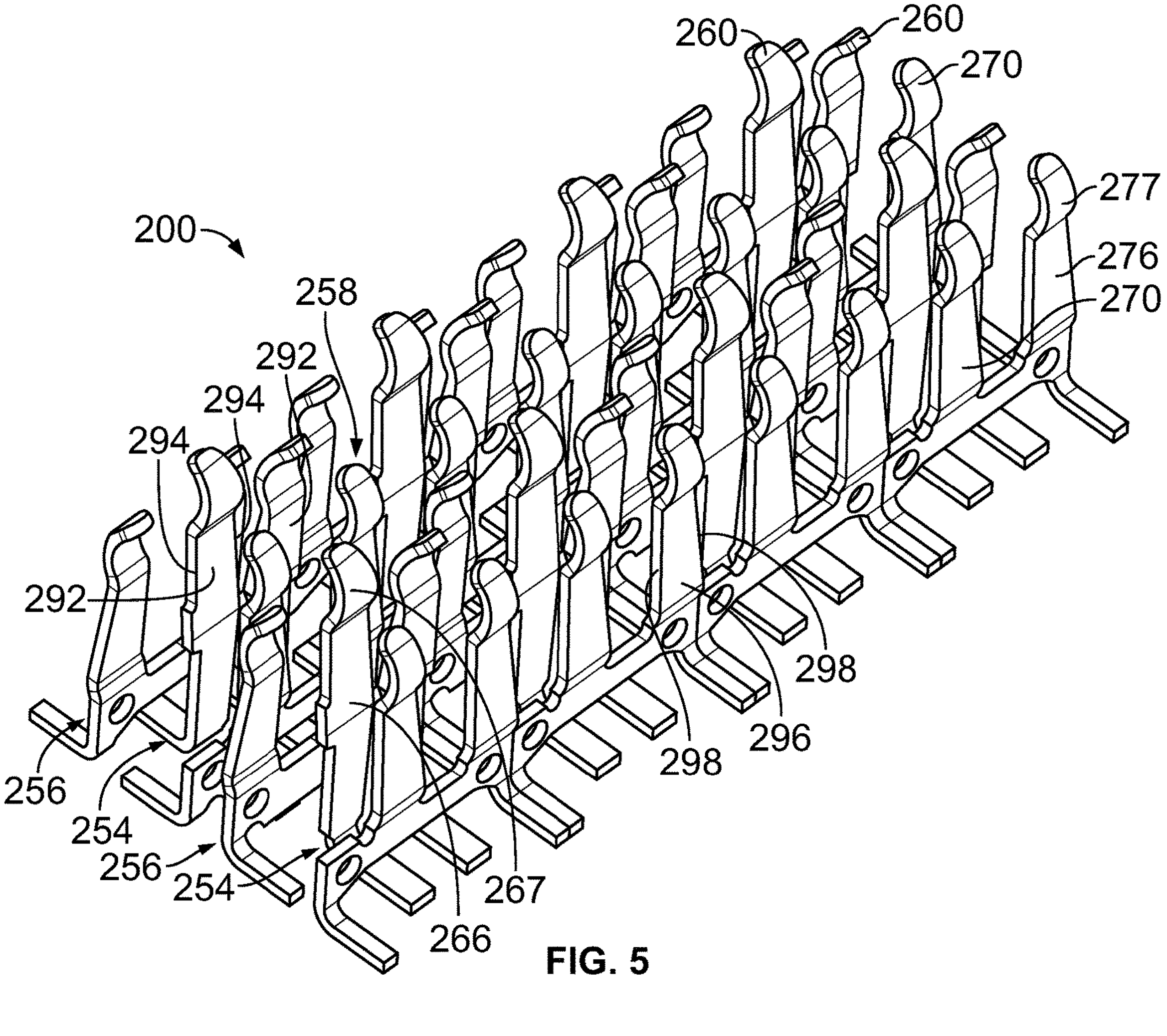
FIG. 5 is a perspective view of a portion of the receptacle connector showing the receptacle signal contacts and the receptacle ground contacts in accordance with an exemplary embodiment.

FIG. 4 is a top view of a portion of the receptacle connector 200 showing the receptacle signal contacts 260 and the receptacle ground contacts 270 in accordance with an exemplary embodiment. FIG. 5 is a perspective view of a portion of the receptacle connector 200 showing the receptacle signal contacts 260 and the receptacle ground contacts 270 in accordance with an exemplary embodiment. FIGS. 4 and 5 illustrate an exemplary arrangement of the receptacle signal contacts 260 and the receptacle ground contacts 270. While FIGS. 4 and 5 illustrate an embodiment having eight pairs (sixteen signal contacts) arranged in a 2×4 arrangement (2 rows by 4 pairs), it is realized that greater or fewer signal contacts may be provided to increase or decrease the density of the receptacle connector 200. For example, additional pairs may be provided in the rows and/or additional rows of the signal contacts may be added to increase the density of the receptacle connector 200.

In an exemplary embodiment, the receptacle signal contacts 260 are arranged in receptacle signal rows 254 and the receptacle ground contacts 270 are arranged in receptacle ground rows 256. The receptacle ground rows 256 are offset from the receptacle signal rows 254. In an exemplary embodiment, each receptacle signal row 254 is flanked by corresponding receptacle ground rows 256 both forward of and rearward of the receptacle signal row 254. As such, shielding is provided both forward of and rearward of each of the receptacle signal contacts 260.

While the receptacle connector 200 is illustrated as having two of the receptacle signal rows 254 and four of the receptacle ground rows 256, it is realized that the receptacle connector 200 may include greater or fewer receptacle signal rows 254 and/or greater or fewer receptacle ground rows 256. In the illustrated embodiment, two different receptacle ground rows 256 are arranged between the pair of the receptacle signal rows 254. However, a single receptacle ground row 256 may be arranged between the pair of the receptacle signal rows 254 in alternative embodiments.

In an exemplary embodiment, no receptacle ground contacts 270 are arranged in the receptacle signal rows 254. Rather, air gaps 258 are arranged between the receptacle signal contacts 260 within the receptacle signal rows 254. In an exemplary embodiment, the receptacle signal contacts 260 and the receptacle ground contacts 270 are generally rectangular in cross-section with two sets of opposing edges/sides. The longer of the edges/sides are broadsides and the shorter of the edges/sides are edgesides. In an exemplary embodiment, each receptacle signal contact 260 includes broadsides 292 and edgesides 294 and each receptacle ground contact 270 includes broadsides 296 and edgesides 298. The broadsides 292, 296 are wider than the corresponding edgesides 294, 298. The edgesides 294, 298 are the cut sides of the contacts formed during the stamping process.

The receptacle signal contacts 260 are arranged such that the edgesides 294 face each other. The receptacle signal contacts 260 are edgeside coupled to each other. In an exemplary embodiment, the receptacle signal contacts 260 within each pair are spaced closer to each other than the spacing between adjacent pairs to promote edgeside coupling (facing of the corresponding edgesides) between the receptacle signal contacts 260 of the corresponding pair. In various embodiments, the interpair spacing for the receptacle signal contacts 260 may be greater than two times (2×) the intrapair spacing for the receptacle signal contacts 260 to promote intrapair coupling and discourage interpair coupling and improve signal performance. Optionally, the interpair spacing for the receptacle signal contacts 260 may be greater than five times (5×) the intrapair spacing for the receptacle signal contacts 260. No receptacle ground contacts 270 are arranged in the receptacle signal rows 254 to prevent edgeside coupling between the receptacle signal contacts 260 and the receptacle ground contacts 270.

The receptacle signal contacts 260 and the receptacle ground contacts 270 are arranged such that the broadsides 292 of the receptacle signal contacts 260 face the broadside(s) 296 of at least one of the corresponding receptacle ground contacts 270. The receptacle signal contacts 260 are broadside coupled (facing of the corresponding broadsides) to the corresponding receptacle ground contacts 270. The receptacle ground contacts 270 are used to suppress noise coupling between the differential pairs, such as between the differential pairs of the signal contacts 260 in different receptacle signal rows 254. In an exemplary embodiment, the receptacle ground contacts 270 in different receptacle ground rows 256 are staggered or offset relative to each other and may be staggered relative to the receptacle signal contacts 260. For example, each receptacle signal contact 260 may be aligned with one of the receptacle ground contacts 270 in one of the flanking receptacle ground rows 256 but offset relative to the receptacle ground contacts 270 in the other flanking receptacle ground row 256. In an exemplary embodiment, the receptacle signal contacts 260 within each pair are aligned with receptacle ground contacts 270 in different receptacle ground rows 256. For example, the first receptacle signal contacts **260*a* within each pair are aligned with the receptacle ground contacts 270*a* in the first receptacle ground row 256*a* (and offset relative to the receptacle ground contacts 270*b* in the second receptacle ground row 256*b*), whereas the second receptacle signal contacts 260*b* within each pair are aligned with the receptacle ground contacts 270*b* in the second receptacle ground row 256*b* (and offset relative to the receptacle ground contacts 270*a* in the first receptacle ground row 256*a*). Such an arrangement allows tighter packaging or spacing of the receptacle signal contacts 260 and the receptacle ground contacts 270 within the receptacle connector 200 by allowing enough space for deflection of the contacts and mating with the plug connector 300** ensuring that the contacts do not short-circuit and retain enough spacing for proper signal integrity.

In an exemplary embodiment, the receptacle signal contacts 260 are arranged within the receptacle connector 200 to face in different directions, which may balance mating forces during mating with the plug connector 300. For example, some of the receptacle signal contacts 260 may be forward facing while other receptacle signal contacts 260 may be rearward facing. In an exemplary embodiment, the receptacle signal contacts 260 within each pair face in opposite directions (for example, one forward facing and one rearward facing). In an exemplary embodiment, within each receptacle signal row 254, some of the receptacle signal contacts 260 may be forward facing and some of the receptacle signal contacts 260 may be rearward facing. However, in alternative embodiments, the receptacle signal contacts 260 may be oriented such that all of the receptacle signal contacts in the each receptacle signal row 254 facing the same direction, but face in a different direction than the receptacle signal contacts in the other receptacle signal row 254, which has the net effect of balancing the mating forces.

In an exemplary embodiment, the receptacle ground contacts 270 are arranged within the receptacle connector 200 to face in different directions, which may balanced mating forces during mating with the plug connector 300. For example, some of the receptacle ground contacts 270 may be forward facing while other receptacle ground contacts 270 may be rearward facing. In an exemplary embodiment, the receptacle ground contacts 270 may be oriented such that all of the receptacle ground contacts in each receptacle ground row 256 facing the same direction, but face in a different direction than the receptacle ground contacts in another receptacle ground row 256, which has the net effect of balancing the mating forces. However, in alternative embodiments, within each receptacle ground row 256, some of the receptacle ground contacts 270 may be forward facing and some of the receptacle ground contacts 270 may be rearward facing.

In an exemplary embodiment, the receptacle signal contacts 260 and the receptacle ground contacts 270 may be arranged such that the signal/ground pairs (for example, the nearest or aligned contacts or the contacts that are broadside coupled) face in the same direction (for example, both forward facing board both rearward facing). For example, the mating interfaces of such contacts facing the same direction such that during mating with the plug connector 300 the spring beams of such contacts are deflected in the same direction (for example, forward deflection or rearward deflection) to generally maintain alignment and spacing when mating with the plug connector 300.

In an exemplary embodiment, the mating interfaces 267 of the receptacle signal contacts 260 and the mating interfaces 277 of the receptacle ground contacts 270 are offset relative to each other. For example, the spring beams 266 of the receptacle signal contacts 260 may be longer than the spring beams 276 of the receptacle ground contacts 270 such that the receptacle signal contacts 260 are mated to the plug connector 300 prior to the receptacle ground contacts 270 mating to the plug connector 300, or vice versa. As such, the overall mating force for mating the plug connector 300 with the receptacle connector 200 is reduced.

Figure 6:
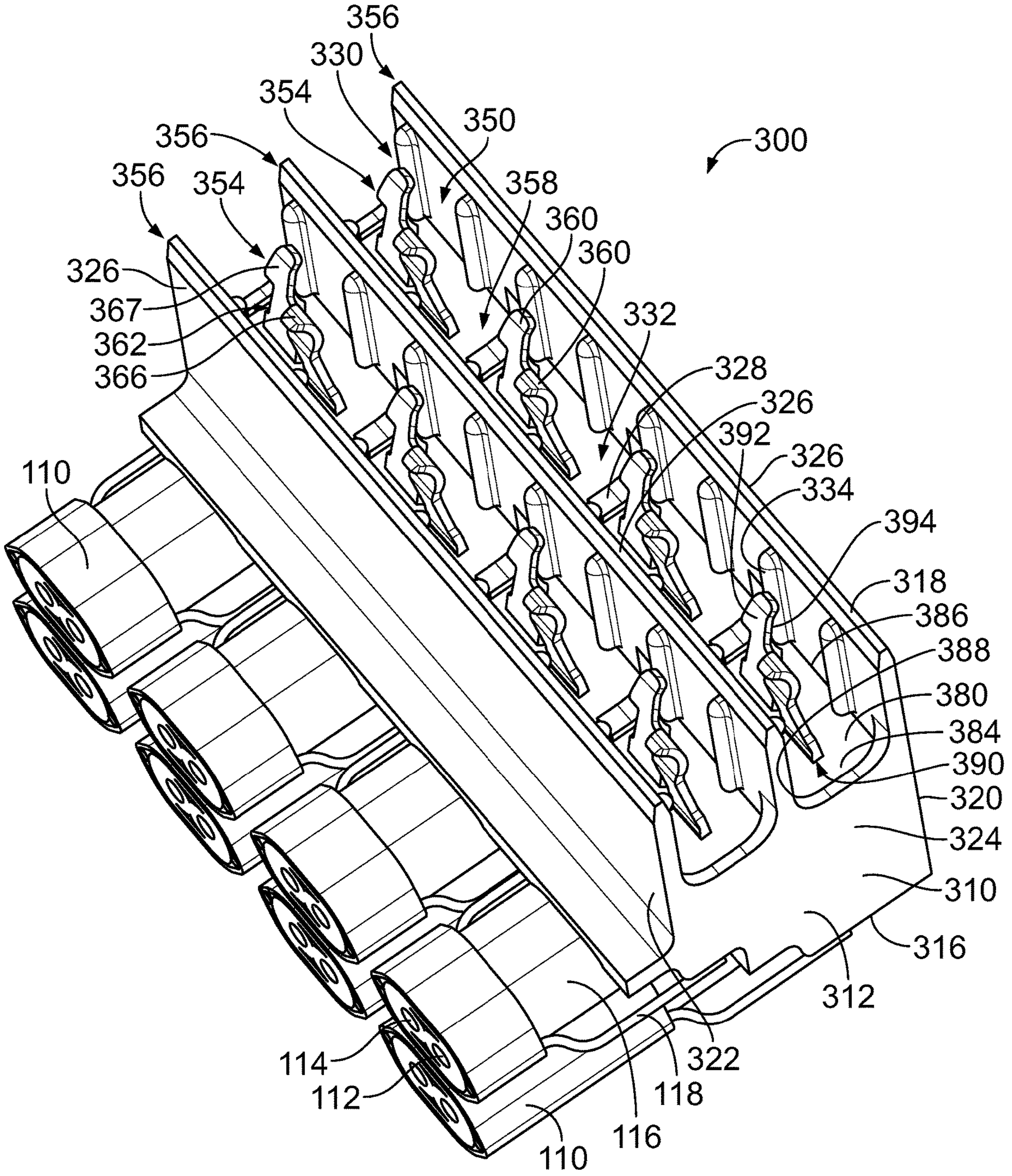
FIG. 6 is a bottom perspective view of the plug connector in accordance with an exemplary embodiment.
Figure 7:
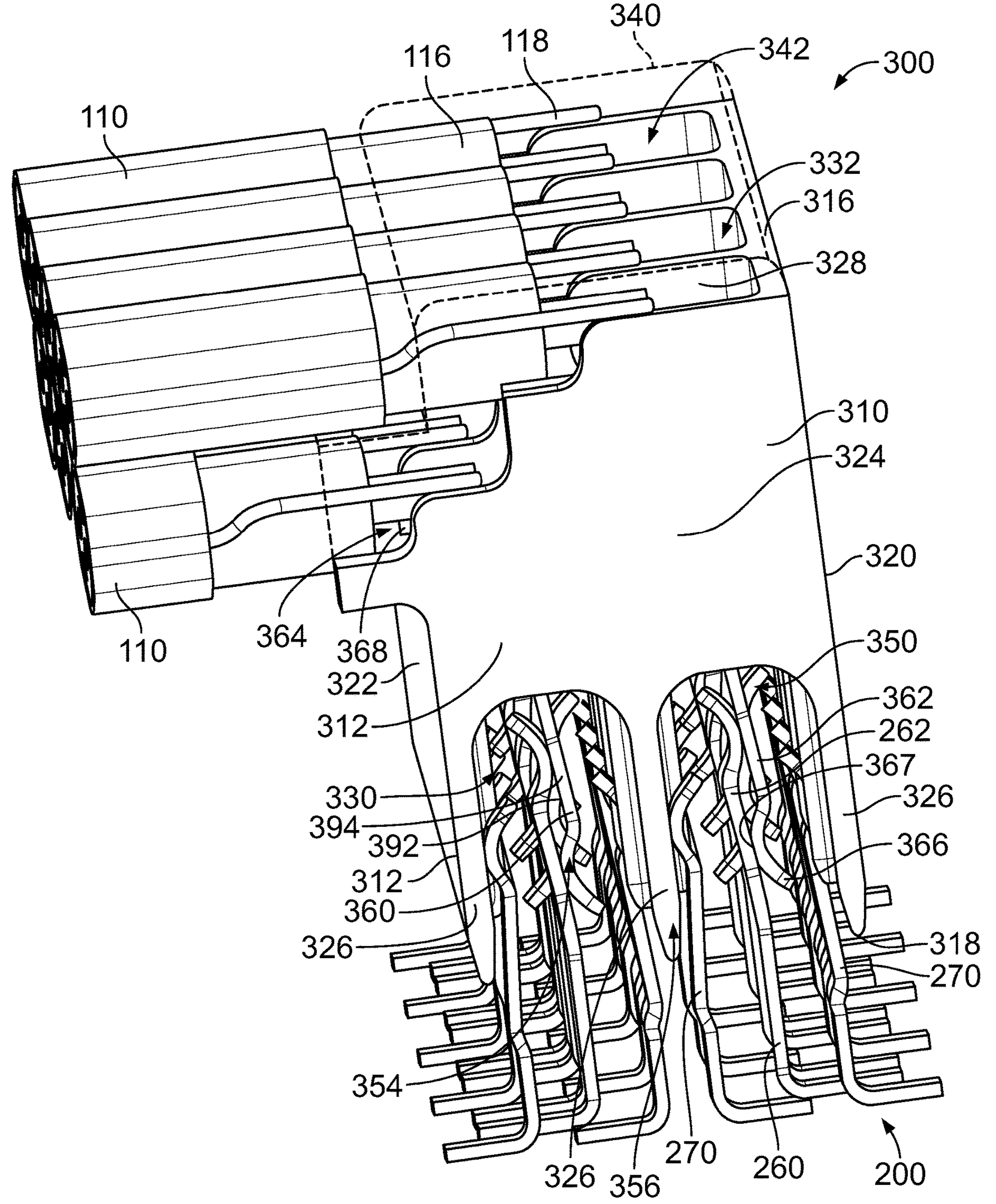
FIG. 7 is a top perspective view of the plug connector in accordance with an exemplary embodiment showing the receptacle signal contacts and the receptacle ground contacts of the receptacle connector mated with the plug connector.

FIG. 6 is a bottom perspective view of the plug connector 300 in accordance with an exemplary embodiment. FIG. 7 is a top perspective view of the plug connector 300 in accordance with an exemplary embodiment showing the receptacle signal contacts 260 and the receptacle ground contacts 270 of the receptacle connector 200 mated with the plug connector 300.

The plug connector 300 includes a plug housing 310 holding a plug contact assembly 350. The plug housing 310 includes walls 312 holding the cables 110 and/or the plug contact assembly 350. The walls 312 extend between a top 316 and the bottom 318 of the plug housing 310. In the illustrated embodiment, the cables 110 are connected to the plug housing 310 at the top 316. The bottom 318 defines a mating end configured to be plugged into the receptacle 214 of the receptacle connector 200. In an exemplary embodiment, the walls 312 include a front wall 320 and a rear wall 322 opposite the front wall 320. Optionally, the walls 312 may include end walls 324 between the front and rear walls 320, 322. The plug housing 310 extends longitudinally between the ends. For example, the front and rear walls 320, 322 may be oriented parallel to the longitudinal axis of the plug housing 310. For example, the plug housing 310 is longer end to end and shorter front to rear.

In an exemplary embodiment, the walls 312 include shield walls 326 configured to be plugged into the receptacle connector 200. The shield walls 326 may be defined by bottom ends of the front and rear walls 320, 322. In the illustrated embodiment, the shield walls 326 include at least one central shield wall 326 located between the front and rear walls 320, 322. The central shield wall 326 may be centered between the front and rear walls 320, 322. In an exemplary embodiment, the walls 312 including connecting walls 328 between the shield walls 326. The shield walls 326 are configured to be electrically connected to the receptacle ground contacts 270. For example, the shield walls 326 are connected to the mating interfaces 277 of the receptacle ground contacts 270. The shield walls 326 are electrically connected by the connecting walls 328.

In an exemplary embodiment, the plug housing 310 is manufactured from a conductive material, such as a conductive plastic material. The plug housing 310 may be die cast from a metal material. The walls 312 provide shielding for the plug contact assembly 350. In an exemplary embodiment, the plug housing 310 includes shield spaces 330 between the shield walls 326. The plug contact assembly 350 is received in the shield spaces 330. The shield walls 326 provide shielding for the plug contact assembly 350 in the shield spaces 330. In an exemplary embodiment, the connecting walls 328 divide the shield spaces 330 into pockets 332. The shield walls 326 and the connecting walls 328 provide shielding between the pockets 332.

In an exemplary embodiment, the plug housing 310 includes ribs 334 extending from the shield walls 326 into the shield spaces 330. The ribs 334 are located relative to the contacts of the plug contact assembly 350 to control signal performance, such as to control resonance along the signal transmission lines through the connectors 200, 300. For example, the positioning of the ribs 334 controls the spacing of the signal transmission lines to the ground structure to control impedance. The ribs 334 may be aligned with corresponding signal contacts. The ribs may be offset from the signal contacts and located in spaced between the signal contacts.

In an exemplary embodiment, the plug housing 310 includes cable channels 342 that receive the ends of the cables 110. The cables 110 are terminated to the plug contact assembly 350 in the cable channels 342. The connecting walls 328 separate the cable channels 342 to provide shielding between the cable channels 342. In an exemplary embodiment, the cable shields 116 of the cables 110 may be terminated to the plug housing 310, such as to the walls 312 (for example, the connecting walls 328). In an exemplary embodiment, the drain wires 118 may be terminated to the plug housing 310, such as to the walls 312 (for example, the connecting walls 328). For example, the drain wires 118 may be soldered to the connecting walls 328.

In an exemplary embodiment, a cover 340 (shown in phantom) may be coupled to the top 316 of the plug housing 310 to cover the ends of the cables 110. The cover 340 may be a molded or diecast part coupled to the receptacle housing 210. Alternatively, the cover 340 may be formed in place around the ends of the cables 110. For example, the cover 340 may be epoxy injection molded into the pockets 332 to cover the ends of the cables 110.

The plug contact assembly 350 is coupled to the plug housing 310. The plug contact assembly 350 is configured to be terminated to the cables 110. The plug contact assembly 350 is configured to be mated with the receptacle connector 200. In an exemplary embodiment, the plug contact assembly 350 includes a plurality of contacts, such as plug signal contacts 360, configured to be electrically connected to the plug connector 300. Optionally, the plug contact assembly 350 may additionally or alternatively include ground contacts and/or power contacts.

The plug signal contacts 360 form signal transmission lines through the plug connector 300 to electrically connect the plug connector 300 to the receptacle connector 200. The shield walls 326 provide shielding for the receptacle signal contacts 260 and the plug signal contacts 360. In an exemplary embodiment, the plug signal contacts 360 are arranged in pairs, which may be configured to convey differential signals. The shield walls 326 provide shielding between the rows of the plug signal contacts 360. In an exemplary embodiment, plug signal contacts 360 are arranged with no plug ground contacts located in line with the rows of the plug signal contacts 360.

Each plug signal contact 360 includes a mating end 362 and a terminating end 364. The mating end 362 is configured to be mated with the mating end 262 of the corresponding receptacle signal contact 260. The mating ends 362 of the plug signal contacts 360 may mate with the receptacle signal contacts 260 prior to the receptacle ground contacts 270 mating to the shield walls 326 to reduce the mating forces during mating. The terminating end 364 is configured to be terminated to the cable 110, such as the corresponding conductor 112, 114 of the cable 110. In an exemplary embodiment, the plug signal contacts 360 are stamped and formed contacts. Optionally, a plurality of the plug signal contacts 360 may be formed from a lead frame where the plug signal contacts 360 are stamped from a common metal sheet and may be connected together by a carrier strip (not shown) which is removed during assembly, such as after the plug signal contacts 360 are overmolded or otherwise retained within a contact holder(s).

In the illustrated embodiment, the mating end 362 includes a spring beam 366 configured to be mated with the corresponding receptacle signal contact 260. The spring beam 366 is deflectable. The spring beam 366 is cantilevered into the shield space 330 for mating with the receptacle signal contact 260. The spring beam 366 includes a mating interface 367 at or near the distal end of the spring beam 366. The spring beam 366 may be curved at the distal end to define the mating interface 367. Other types of contacts may be used in alternative embodiments, such as pin contacts, socket contacts, blade contacts, and the like.

In the illustrated embodiment, the terminating end 364 includes a solder pad 368 configured to be soldered to the conductor 112, 114 of the corresponding cable 110. Optionally, the solder pad 368 may be bent at a right angle relative to the spring beam 366. For example, the solder pad 368 may be oriented generally horizontally while the spring beam 366 may be oriented generally vertically. Other types of terminating portions may be provided at the terminating end 364. In some embodiments, rather than terminating to the cables 110, the terminating ends may be terminated to a circuit board.

In an exemplary embodiment, the plug contact assembly 350 includes one or more contact holders 380 that hold the plug signal contacts 360. The contact holder 380 is configured to be coupled to the plug housing 310 to position the plug signal contacts 360 relative to the plug housing 310. In the illustrated embodiment, each the contact holder 380 is configured to hold a pair of the plug signal contacts 360. However, the contact holders 380 may be designed to hold a greater number of plug signal contacts 360 in alternative embodiments.

In an exemplary embodiment, the contact holder 380 is manufactured from a dielectric material. For example, the contact holder 380 may be a molded plastic part. In various embodiments, the contact holder 380 may be formed in place on the plug signal contacts 360. For example, the contact holder 380 may include an overmold body that is overmolded over the plug signal contacts 360. In alternative embodiments, the plug signal contacts 360 may be stitched or otherwise loaded into the pre-molded contact holder 380. The contact holder 380 includes a top (not shown) and a bottom 384. The contact holder 380 includes a front 386 and a rear 388 opposite the front 386. The contact holder 380 includes channels 390 that receive the corresponding plug signal contacts 360. The channels 390 extend between the top and the bottom 384.

In an exemplary embodiment, the plug signal contacts 360 are assembled with the contact holder 380 prior to loading the contact holder 380 into the plug housing 310. For example, the contact holder 380 is used to load the plug signal contacts 360 into the plug housing 310. In an exemplary embodiment, the contact holder 380 is received in the corresponding pocket 332 in the plug housing 310, such as between the shield walls 326 and between the connecting walls 328.

In an exemplary embodiment, the plug signal contacts 360 are arranged in plug signal rows 354. The shield walls 326 define plug ground rows 356 flanking the plug signal rows 354. The plug ground rows 356 are offset from the plug signal rows 354. In an exemplary embodiment, each plug signal row 354 is flanked by corresponding plug ground rows 356 both forward of and rearward of the plug signal row 354. As such, shielding is provided both forward of and rearward of each of the plug signal contacts 360.

While the plug connector 300 is illustrated as having two of the plug signal rows 354 and three of the plug ground rows 356, it is realized that the plug connector 300 may include greater or fewer plug signal rows 354 and/or greater or fewer plug ground rows 356. The two central receptacle ground rows of receptacle ground contacts 270 are configured to engage opposite sides of the central shield wall 326. The outer receptacle ground rows of receptacle ground contacts 270 are configured to engage the shield walls 326 at the front and the rear of the plug housing 310. The ground connections create a ground return path through the connectors 200, 300 between the cables 110 and the circuit board 102.

In an exemplary embodiment, no plug ground contacts are arranged in the plug signal rows 354. Rather, air gaps 358 are arranged between the plug signal contacts 360 within the plug signal rows 354. In an exemplary embodiment, each plug signal contact 360 includes broadsides 392 and edgesides 394. The broadsides 392 are wider than the edgesides 394. The edgesides 394 are the cut sides of the contacts formed during the stamping process.

The plug signal contacts 360 are arranged such that the edgesides 394 face each other. The plug signal contacts 360 are edgeside coupled to each other. In an exemplary embodiment, the plug signal contacts 360 within each pair are spaced closer to each other than the spacing between adjacent pairs to promote edgeside coupling between the plug signal contacts 360 of the corresponding pair. No plug ground contacts are arranged in the plug signal rows 354 to prevent edgeside coupling between the plug signal contacts 360 and such plug ground contacts. The plug signal contacts 360 are arranged such that the broadsides 392 of the plug signal contacts 360 face the shield walls 326. The plug signal contacts 360 are broadside coupled to the shield walls 326. The shield walls 326 are used to suppress noise coupling between the differential pairs, such as between the differential pairs of the signal contacts 360 in different plug signal rows 354.

In an exemplary embodiment, the plug signal contacts 360 are arranged within the plug connector 300 to face in different directions, which may balance mating forces during mating with the plug connector 300. For example, some of the plug signal contacts 360 may be forward facing while other plug signal contacts 360 may be rearward facing. In an exemplary embodiment, the plug signal contacts 360 within each pair face in opposite directions (for example, one forward facing and one rearward facing). In an exemplary embodiment, within each plug signal row 354, some of the plug signal contacts 360 may be forward facing and some of the plug signal contacts 360 may be rearward facing. However, in alternative embodiments, the plug signal contacts 360 may be oriented such that all of the plug signal contacts in the each plug signal row 354 facing the same direction, but face in a different direction than the plug signal contacts in the other plug signal row 354, which has the net effect of balancing the mating forces.

When mated, high speed signals may be transmitted through the connectors 200, 300 between the cables 110 and the circuit board 102. The connectors 200, 300 have high signal density and may perform at high speeds, such as in the 112 gb/s or the 224 gb/s range. The arrangement of the shield structure, relative to the signal transmission lines controls crosstalk and resonances through the connectors 200, 300. For example, by keeping the signal contacts 260, 360 broadside coupled to the ground structure (for example, the ground contacts 270 and the shield walls 326) and edge coupled to the other signal contacts 260, 360, the resonance may be controlled. The arrangement of the ground structure in the ground rows located between the signal rows (for example, no ground contacts in the signal rows) controls the resonance through the mating interface. The split hermaphroditic arrangement of the signal contacts 260, 360 balances mating forces to allow the mating interface to fit in a tight space with the high density arrangement of the signal contacts through the connectors 200, 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector system comprising:

a receptacle connector including a receptacle housing holding a receptacle contact assembly, the receptacle housing having walls forming a receptacle, the receptacle contact assembly including receptacle signal contacts and receptacle ground contacts, the receptacle signal contacts arranged in pairs, the receptacle signal contacts arranged in receptacle signal rows, the receptacle ground contacts arranged in receptacle ground rows offset from the receptacle signal rows, wherein the receptacle signal contacts are arranged in the receptacle signal rows without any shielding structure in the receptacle signal rows between the pairs of the receptacle signal contacts;

a plug connector configured to be plugged into the receptacle, the plug connector including a plug housing holding a plug contact assembly, the plug housing having shield walls arranged parallel to each other and shield spaces between the shield walls, the plug contact assembly including plug signal contacts arranged in pairs, the plug signal contacts located in the shield spaces in plug signal rows;

wherein the receptacle signal contacts are mated with the corresponding plug signal contacts, and wherein the receptacle ground contacts are mated with the corresponding shield walls of the plug housing.

2. The electrical connector system of claim 1, wherein air gaps are defined between the pairs of the receptacle signal contacts in the receptacle signal rows and air gaps are defined between the pairs of the plug signal contacts in the plug signal rows.

3. The electrical connector system of claim 1, wherein the receptacle signal contacts are arranged in the receptacle signal rows without any receptacle ground contacts arranged between the pairs of the receptacle signal contacts.

4. The electrical connector system of claim 1, wherein the receptacle signal contacts include broadsides and edgesides, the receptacle signal contacts in the receptacle signal rows being edgeside coupled to each other, the receptacle signal contacts being broadside coupled to the receptacle ground contacts.

5. The electrical connector system of claim 1, wherein the receptacle signal contacts include mating interfaces, the mating interfaces of the receptacle signal contacts in each pair face in opposite directions.

6. The electrical connector system of claim 1, wherein the receptacle ground contacts are aligned with corresponding receptacle signal contacts along axes that are perpendicular to the receptacle signal rows and the receptacle ground rows.

7. The electrical connector system of claim 6, wherein the receptacle signal contacts in each pair are aligned with the receptacle ground contacts in different receptacle ground rows.

8. The electrical connector system of claim 1, wherein the receptacle ground contacts are arranged in two different receptacle ground rows between two of the receptacle signal rows.

9. The electrical connector system of claim 1, wherein the receptacle signal rows of the receptacle signal contacts are separated by the corresponding shield walls.

10. The electrical connector system of claim 1, wherein the receptacle ground contacts in each receptacle ground row are connected by corresponding connecting beams to electrically common the receptacle ground contacts.

11. The electrical connector system of claim 1, wherein the walls of the receptacle housing include a front wall and a rear wall, the receptacle signal rows and the receptacle ground rows extending parallel to the front wall and the rear wall, each receptacle signal rows being flanked by corresponding receptacle ground rows both forward and rearward of the receptacle signal rows.

12. The electrical connector system of claim 11, wherein each receptacle signal rows is flanked by corresponding shield walls both forward and rearward of the receptacle signal row.

13. The electrical connector system of claim 1, wherein the receptacle signal contacts include mating interfaces and the receptacle ground contacts include mating interfaces, the mating interfaces of the receptacle signal contacts are configured to mate with the corresponding plug signal contacts prior to the mating interfaces of the receptacle ground contacts mating with the corresponding shield walls.

14. The electrical connector system of claim 1, wherein the shield walls include ribs extending from the shield walls into the shield spaces, the ribs located between the receptacle ground contacts, the receptacle ground contacts engaging the shield walls at locations between the ribs.

15. The electrical connector system of claim 1, wherein the receptacle contact assembly includes at least one contact holder holding the corresponding receptacle signal contacts and the receptacle ground contacts, the at least one contact holder being coupled to the receptacle housing to position the corresponding receptacle signal contacts and receptacle ground contacts in the receptacle for mating with the plug connector.

16. The electrical connector system of claim 1, wherein the plug housing is electrically conductive, the plug contact assembly including at least one contact holder holding the corresponding plug signal contacts and electrically isolating the plug signal contacts from the plug housing.

17. The electrical connector system of claim 1, wherein the plug connector includes cables coupled to the plug contact assembly, the cables including conductors and cable shields surrounding the conductors, the conductors terminated to the corresponding plug signal contacts, the cable shields being electrically connected to the plug housing, wherein the cables extend from the housing generally perpendicular to the plug signal contacts.

18. The electrical connector system of claim 1, wherein the receptacle connector is mounted to a circuit board, the receptacle signal contacts include solder tabs configured to be soldered to board contacts of the circuit board.

19. The electrical connector system of claim 1, wherein the plug housing includes connecting walls between the shield walls, the shield walls of the plug housing being electrically connected by the connecting walls.

20. A receptacle connector configured to be mated with a plug connector of an electrical connector system, the receptacle connector comprising:

receptacle housing having walls forming a receptacle, the walls including a front wall and a rear wall;

a receptacle contact assembly held in the receptacle housing, the receptacle contact assembly including receptacle signal contacts and receptacle ground contacts, the receptacle signal contacts arranged in pairs, the receptacle signal contacts arranged in receptacle signal rows without any receptacle ground contacts arranged between the pairs of the receptacle signal contacts, the receptacle ground contacts arranged in receptacle ground rows offset from the receptacle signal rows, wherein the receptacle signal contacts are arranged in the receptacle signal rows without any shielding structure in the receptacle signal rows between the pairs of the receptacle signal contacts.

21. A plug connector configured to be mated with a receptacle connector of an electrical connector system, the plug connector comprising:

a plug housing having shield walls arranged parallel to each other and shield spaces between the shield walls;

a plug contact assembly held in the plug housing, the plug contact assembly including plug signal contacts arranged in pairs, the plug signal contacts located in the shield spaces in plug signal rows, wherein air gaps are defined between the pairs of the plug signal contacts in the plug signal rows, wherein the plug signal contacts are arranged in the plug signal rows without any shielding structure in the plug signal rows between the pairs of the plug signal contacts; and cables coupled to the plug contact assembly, the cables including conductors and cable shields surrounding the conductors, the conductors terminated to the corresponding plug signal contacts, the cable shields being electrically connected to the plug housing, wherein the cables extend from the housing.

* * * * *